US008243193B2

(12) United States Patent
Tsou

(10) Patent No.: US 8,243,193 B2
(45) Date of Patent: Aug. 14, 2012

(54) CAMERA MODULE AND PORTABLE ELECTRONIC DEVICE USING THE MODULE

(75) Inventor: Tsung-Ying Tsou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 493 days.

(21) Appl. No.: 12/501,241

(22) Filed: Jul. 10, 2009

(65) Prior Publication Data

US 2010/0066893 A1  Mar. 18, 2010

(30) Foreign Application Priority Data

Sep. 16, 2008 (CN) .......................... 2008 1 0304514

(51) Int. Cl.
*H04N 5/225* (2006.01)
*H04N 5/222* (2006.01)
(52) U.S. Cl. ....................................... 348/373; 348/340

(58) Field of Classification Search .................. 348/340, 348/373
See application file for complete search history.

(56) References Cited

U.S. PATENT DOCUMENTS

| 5,150,215 | A  | * | 9/1992 | Shi ................................. 348/64 |
| 6,532,035 | B1 | * | 3/2003 | Saari et al. .................. 348/14.02 |
| 2002/0067426 | A1 | * | 6/2002 | Nagata et al. ................. 348/373 |
| 2003/0036365 | A1 | * | 2/2003 | Kuroda .......................... 455/90 |
| 2008/0068451 | A1 | * | 3/2008 | Hyatt ............................. 348/36 |

FOREIGN PATENT DOCUMENTS

JP  10-4540 A  1/1998

* cited by examiner

*Primary Examiner* — Hung Lam
(74) *Attorney, Agent, or Firm* — Altis Law Group, Inc.

(57) ABSTRACT

A camera module includes a housing, a lens unit, and a rotating unit. The rotating unit rotatably connects to one end of the housing. The lens unit is mounted on the other end of the housing. The rotating unit includes a rotating platform and a reflector mounted thereon. When the rotating platform rotates, the reflector rotates accordingly.

4 Claims, 4 Drawing Sheets

CAMERA MODULE AND PORTABLE ELECTRONIC DEVICE USING THE MODULE

BACKGROUND

1. Technical Field

The disclosure relates to a camera module, and particularly to a portable electronic device with a camera module.

2. Description of Related Art

Portable electronic devices in common and widespread use including cell phones, cameras, PDAs, music players, notebooks, and many others. Camera and image transmitting function have been highlighted. A conventional camera is mounted in a fixed location of a main body of the portable electronic device. This structure prevents the camera from targeting an object facing a different direction without repositioning the device, since the camera lens is fixed.

Therefore, there is room for improvement within the art.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module.

Figure 1:
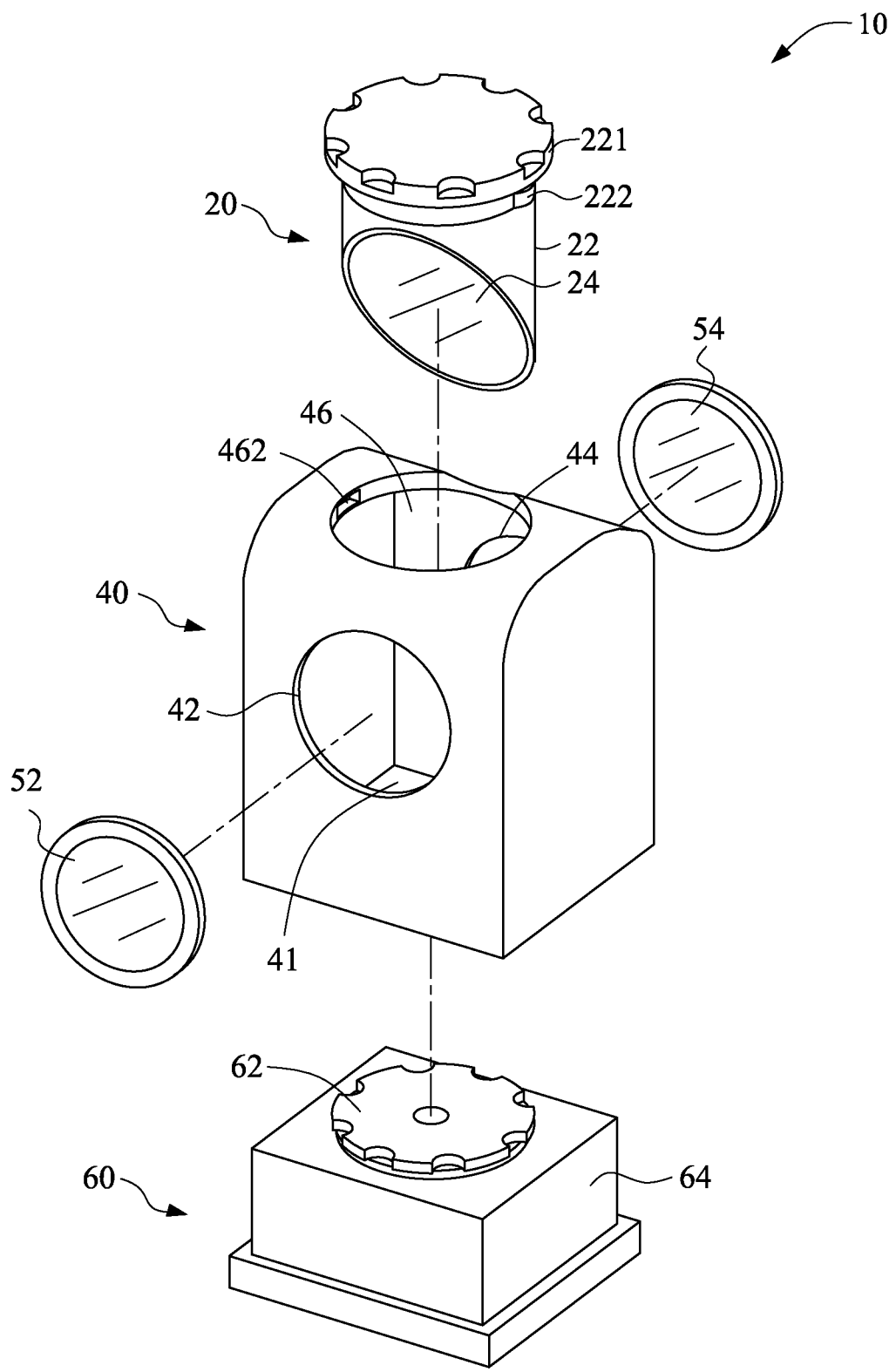
FIG. 1 is an assembly drawing of a camera module in accordance with the disclosure.

Corresponding reference characters indicate corresponding parts throughout the several views. The exemplifications set out herein illustrate at least one embodiment of the present charging apparatus, in one form, and such exemplifications are not to be construed as limiting the scope of the invention in any manner.

DETAILED DESCRIPTION

Referring to FIG. 1, a camera module 10 includes a rotating unit 20 rotatably connected to the upper end of a housing 40, and a lens unit 60 fixed in a bottom end of the housing 40.

The rotating unit 20 includes a cylindrical rotating component 22, a reflector 24 formed on one end of the rotating component 22, and a rotating platform 221 formed on the other end of the rotating component 22. At least one protrusion 222 is formed on the outer surface of the rotating component 22. An angle between the reflector 24 and the platform 221 is about 0° to about 90°. In one embodiment, the angle is 45°. The reflector 24 rotates along the center axis of the rotating component 22 with the rotation of the rotating component 22.

The housing 40 is generally hollow. A first hole 42 and a second hole 44 are defined through a front and a rear wall of the housing 40. The holes 42 and 44 are aligned. A first transparent window 52 is installed on the first hole 42. A second transparent window 54 is installed on the second hole 44. An arcuate sidewall connects the front and the rear wall, wherein the arcuate sidewall has a central hole 46, through which rotating component 22 extends. The diameter of the rotating component 22 is less than that of the central hole 46. At least one groove 462 formed on the fringe of the central hole 46 corresponds to the protrusions 222. An opening 41 is formed on the bottom of the housing 40.

The lens unit 60 includes a lens 62 and a fixed support 64 having an image sensor therein (not shown). The fixed support 64 is mounted on the opening 41.

Figure 2:
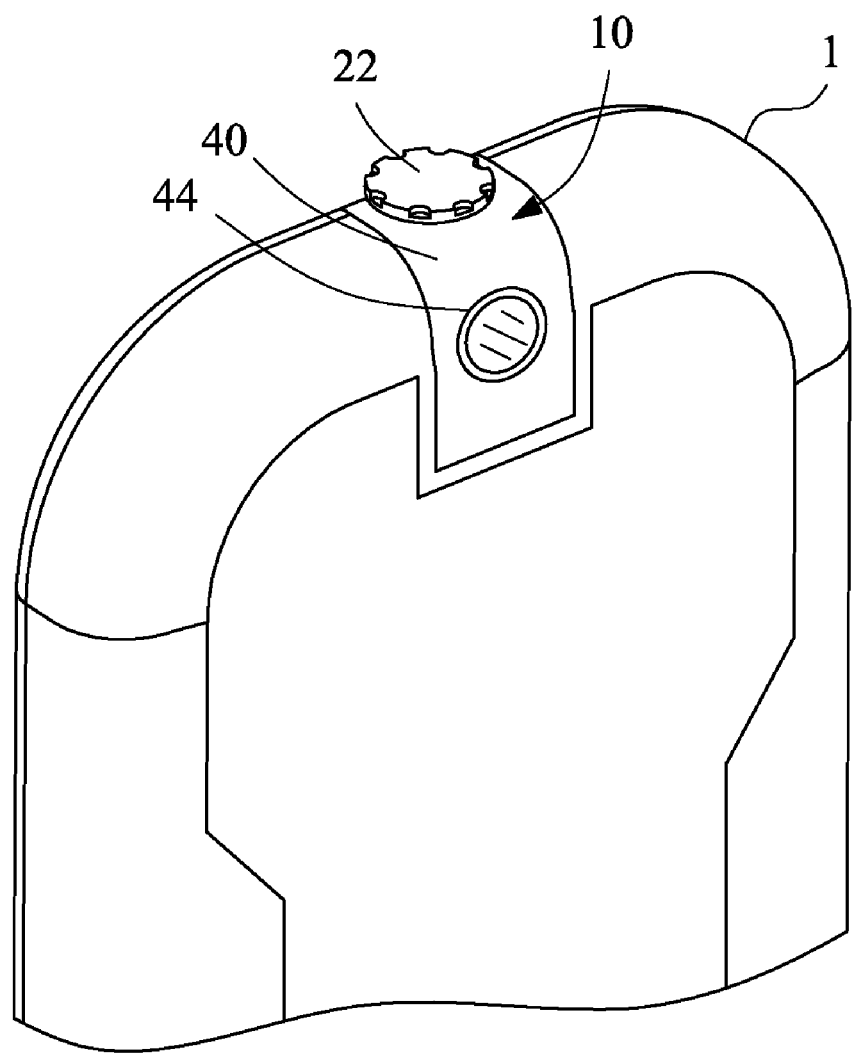
FIG. 2 is a schematic view of a portable electronic device utilizing a camera module such as, for example, that of FIG. 1.
Figure 3:
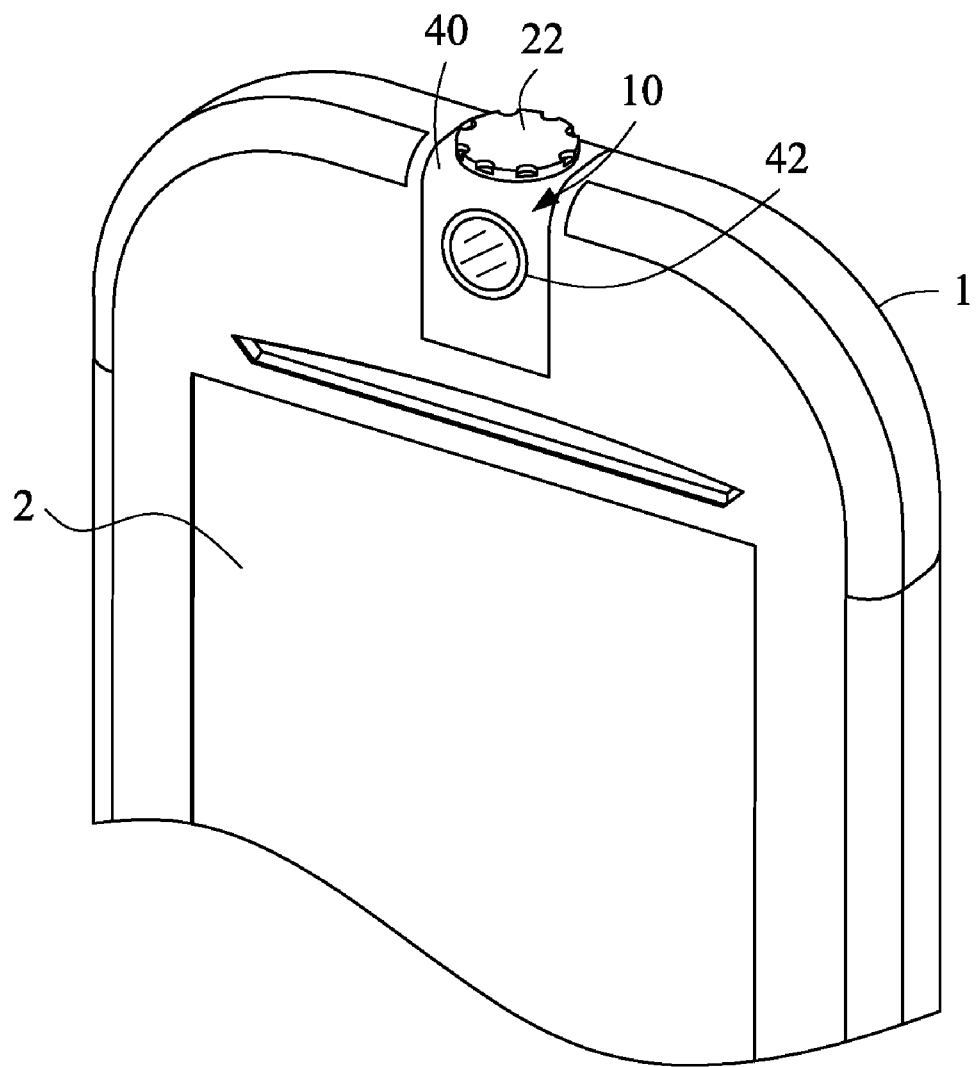
FIG. 3 is a schematic view of the portable electronic device of FIG. 2, viewed from different aspects.

Referring to FIG. 2 and FIG. 3, the camera module 10 is mounted on a portable electronic device 1. A display panel such as an LCD is installed in one side of the portable electronic device 1. The camera module 10 is mounted on the upper end of the portable electronic device 1. The first hole 42 faces in the same direction of the LCD, and the second hole 44 faces in the opposite direction. The reflector 24 rotates along the center axis of the rotating component 22 with the rotating component 22. When the protrusions 222 are received in the groove 462, the reflector targets the first hole 42 or second hole 44. The image light rays via the reflector 24 are received by the image sensor of the lens unit 60. The portable electronic device 1 with a camera module 10 is able to target objects in the same direction of the LCD and on the opposite side of the LCD without moving the body of camera module 10. The image sensor of the lens unit 60 receives the image light rays of these objects by rotation of the rotating component 22.

Figure 4:
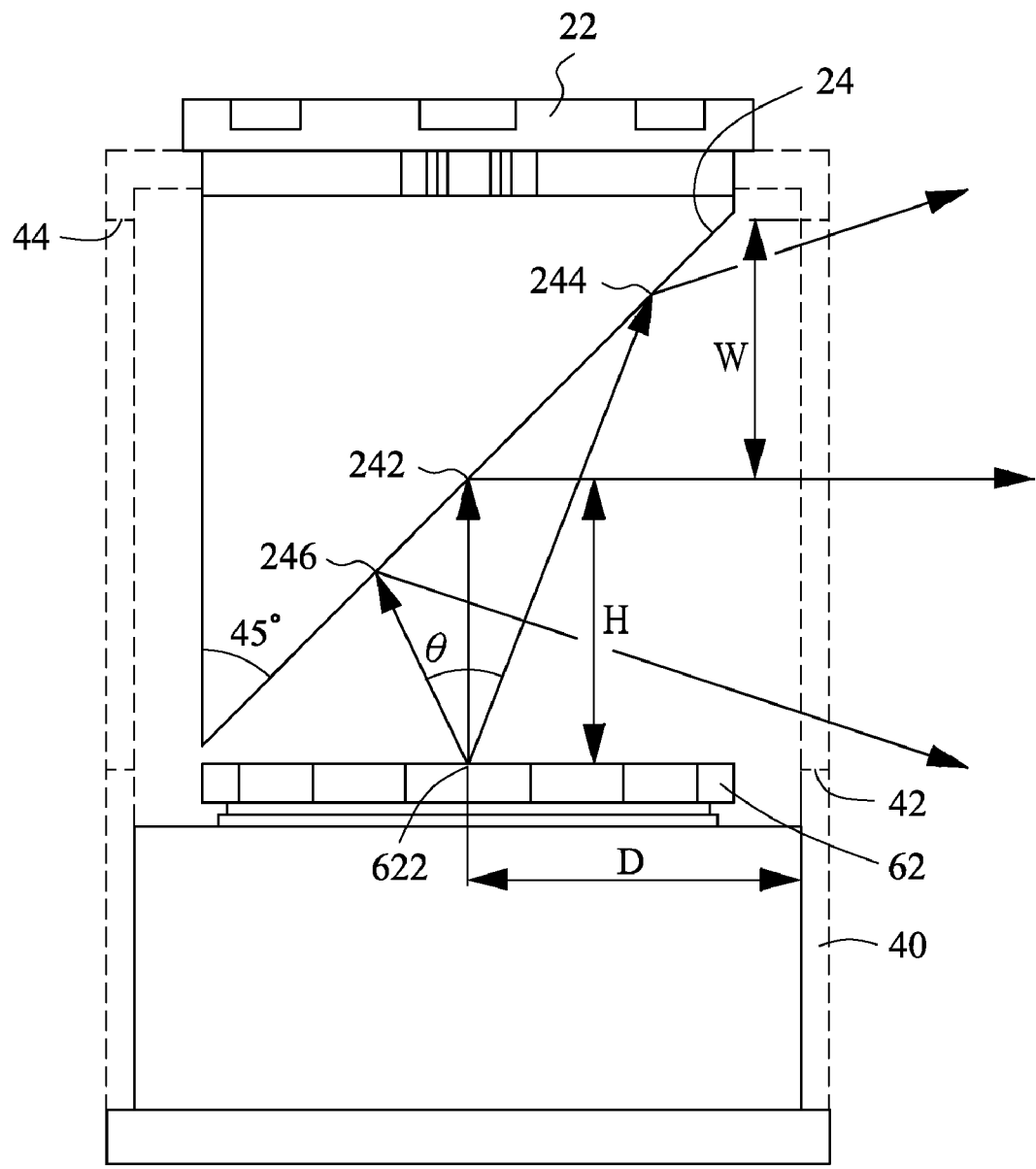
FIG. 4 is a perspective drawing of the camera module of FIG. 1.

Referring to FIG. 4, the angle between the reflector 24 and the lens unit 60 is 45°. The image light rays are reflected by the reflector 24 and received by the lens unit 60. When the reflector 24 aims at the first hole 42, the image light rays of the first hole 42 are received by the lens 62. When the reflector 24 aims at the second hole 44, the image light rays of the second hole 42 are received by the lens 62. Easy and accurate preview of image light rays on the same or opposite side of the LCD without repositioning the camera module 10.

Here, the lens 62 has a surface center 622 and an angle θ, extension of the perspective in the reflector 24 form a first reflection point 244, a second reflection point 246, and a center reflection point 242. The distance between the surface center 622 and the center reflection point 242 is H. The distance between the surface center 622 and the inner wall of the housing 40 is D.

The diameter of the first hole 42 is equal to the diameter of the second hole 44. The diameter of the first hole 42 is 2W, wherein $W=(D+H)\tan(\theta/2)$.

Compared with conventional camera modules of portable electronic devices, the rotating component 22 only rotates reflector 24, has a simplified structure and does not require a lot of space. The lens unit 60 is fixed on the Printed Circuit Board avoiding damage due to rotation.

Finally, it is to be understood that the embodiments described are intended to illustrate rather than limit the invention. Variations may be made to the embodiments without departing from the spirit of the invention as claimed. The embodiments illustrate the scope of the invention but do not restrict the scope of the invention.

What is claimed is:

1. A camera module comprising:
   a housing defining a first hole, a second hole aligned with the first hole, and a central hole;
   a first transparent window installed on the first hole, and a second transparent window installed on the second hole;
   a rotating unit rotatably received in the central hole of the housing, wherein the rotating unit comprises a cylindrical rotating component, a reflector formed on one tilted end of the rotating component, and a rotating platform formed on the other end of the rotating component; the rotating platform protruding from a top of the housing and being substantially parallel to the top of the housing; and a lens unit fixed in the other end of the housing and facing the reflector;

wherein when the rotating component is rotated to vary the direction of the reflector, the reflector faces and receives image light rays from one of the first transparent window and the second transparent window to the lens unit, the rotating component blocks light rays from the other of first transparent window and the second transparent window.

2. The camera module as claimed in claim 1, wherein the housing comprises an opening on another end thereof opposite to the central hole, the lens unit includes a lens and a fixed support, the fixed support is mounted in the opening.

3. The camera module as claimed in claim 1, wherein an angle between the reflector and the lens unit is about 45°.

4. A portable electronic device comprising:

a housing including a first wall, a second wall, and an arcuate sidewall connecting the first wall and the second wall, the first wall defining a first hole and the second wall defining a second hole aligned with the first hole, the arcuate sidewall defining a central hole;

a first transparent window installed on the first hole, and a second transparent window installed on the second hole;

a rotating unit rotatably received in the central hole of the housing, wherein the rotating unit comprises a cylindrical rotating component, a reflector formed on one tilted end of the rotating component, and a rotating platform formed on the other end of the rotating component, the rotating platform protruding from a top of the housing and being substantially parallel to the top of the housing, at least one protrusion formed on the rotating component; and a lens unit fixed in the other end of the housing and facing the reflector;

wherein when the rotating unit is rotated to allow the protrusion to be received in the groove, the reflector faces and receives image light rays from one of the first transparent window and the second transparent window to the lens unit, the rotating component blocks light rays from the other of first transparent window and the second transparent window.

* * * * *